United States Patent
Osako et al.

(10) Patent No.: US 7,183,533 B2
(45) Date of Patent: Feb. 27, 2007

(54) OPTICAL MULTI-AXIS OPTOELECTRONIC SENSOR

(75) Inventors: Kazunori Osako, Fukuchiyama (JP); Tetsuya Akagi, Fukuchiyama (JP); Satoru Shimokawa, Otsu (JP)

(73) Assignee: Omron Corporation, Kyoto (JP)

( * ) Notice: Subject to any disclaimer, the term of this patent is extended or adjusted under 35 U.S.C. 154(b) by 146 days.

(21) Appl. No.: 10/951,032

(22) Filed: Sep. 28, 2004

(65) Prior Publication Data

US 2005/0109919 A1    May 26, 2005

(30) Foreign Application Priority Data

Sep. 30, 2003    (JP)    ............... 2003-340010

(51) Int. Cl.
  *G01V 9/04*    (2006.01)
(52) U.S. Cl. .............. 250/221; 340/555; 187/317
(58) Field of Classification Search ........... 250/221, 250/222.1; 340/555–557; 187/317, 391–393
  See application file for complete search history.

(56) References Cited

U.S. PATENT DOCUMENTS 5,567,931 A * 10/1996 Amend et al. ............ 250/221
5,696,362 A * 12/1997 Amend ..................... 187/317
6,167,991 B1 * 1/2001 Full et al. ................ 187/317

FOREIGN PATENT DOCUMENTS

| JP | 05-025839 | 4/1993 |
| JP | 11-017513 | 1/1999 |
| JP | 11-136114 | 5/1999 |
| JP | 2002-296361 | 10/2002 |
| JP | 2002-323574 | 11/2002 |

\* cited by examiner

*Primary Examiner*—Kevin Pyo
(74) *Attorney, Agent, or Firm*—Foley & Lardner LLP

(57) ABSTRACT

An optical multi-axis optoelectronic sensor, in which a phototransmitting sensor head having a plurality of phototransmitters arranged thereon and a photoreceiving sensor head having a plurality of photoreceivers arranged thereon are disposed opposite to each other, comprises: first device for inputting distance data equivalent to a distance between the sensor heads; second device for determining detection sensitivity based on the distance data input by the first device; and third device for setting the detection sensitivity determined by the second device.

9 Claims, 12 Drawing Sheets

Fig. 11

| Input distance value | Manual display value | Phototrans- mitting intensity | Amplification ratio | Threshold |
|---|---|---|---|---|
| 500 ~ 550 | 1 | 11 | G1 | Th1 |
| 551 ~ 650 | 2 | 12 | G2 | Th2 |
| 651 ~ 800 | 3 | 13 | G3 | Th3 |
| 801 ~ 1000 | 4 | 14 | G4 | Th4 |
| . | . | . | . | . |
| . | . | . | . | . |
| . | . | . | . | . |
| yyyy ~ xxxx | n-1 | In-1 | Gn-1 | Thn-1 |
| xxxx ~ 10000 | n | In | Gn | Thn |

OPTICAL MULTI-AXIS OPTOELECTRONIC SENSOR

BACKGROUND OF THE INVENTION

1. Field of the Invention

The present invention relates to an optical multi-axis optoelectronic sensor suitable for use as, for example, a light curtain and an area sensor and, more particularly, to an optical multi-axis optoelectronic sensor, in which an appropriate detection sensitivity can be set according to a distance between sensor heads.

2. Description of the Related Art

An optical multi-axis optoelectronic sensor is generally configured such that a phototransmitting sensor head (i.e., a phototransmitter) having a plurality of phototransmitting elements is arranged on one side while a photoreceiving sensor head (i.e., a photoreceiver) having the same number of photoreceiving elements as that of the phototransmitting elements is arranged on an opposite side. In the case of use as a light curtain, a detection light beam emitted from the phototransmitter is shielded or reflected before the photoreceiver if an object intrudes into a region to be detected (i.e., a dangerous region), so that the intensity of a light beam received by the photoreceiver is partly or wholly varied (in other words, the intensity of a light beam is attenuated), thereby detecting the intrusion of the object. In contrast, in the case of use as an area sensor, either one of optical axes is shielded by an intruding object if the object intrudes into a region to be detected, so that the intensity of a light beam received by one or two or more photoreceiving elements concerned is attenuated, thereby detecting the intrusion of the object into a predetermined region (i.e., a predetermined area).

In the case of an optical multi-axis optoelectronic sensor, since the phototransmitting elements and the photoreceiving elements in the phototransmitter and the photoreceiver, respectively, are integrated with main units (i.e., the phototransmitter and the photoreceiver) when a product is assembled, the intensity of the light beam received by each of the optical axes is liable to be varied, unlike a single optoelectronic sensor or the like. In addition, in order to secure the detection of a greatest distance by the conventional optical multi-axis optoelectronic sensor, it is general that all of the phototransmitting elements are made to emit the light beams in the maximum rated intensity of the light beam substantially irrespective of actual installation environment (i.e., principally, the distance between the sensor heads) while the amplification ratio of an amplifier is made highest on a photoreceiving side, and further, that a photoreceiving judgment threshold is set to a lowest value to such an extent that no erroneous operation can be caused by noise generated inside of a circuit (see, for example, Jpn. Pat. Appln. KOKAI Publication No. 2002-323574).

As described above, since the conventional optical multi-axis optoelectronic sensor has the problem of variations in the intensity of the light beam received by each of the optical axes and the problem of secureness of the greatest detection distance, the phototransmitting intensity, the amplification ratio and the photoreceiving judgment threshold are fixed. Therefore, problems below are pointed out:

(1) detection judgments by other adjacent optoelectronic sensors are liable to be adversely affected by the high phototransmitting intensity; and (2) a light beam shielding state is liable to be erroneously judged as a light beam incident state in a situation in which light beams detected by other optoelectronic sensors are incident into its own photoreceiving elements since the photoreceiving signal amplification ratio is high and the photoreceiving judgment threshold is small.

SUMMARY OF THE INVENTION

The present invention has been accomplished to solve the above-described problems experienced in the prior art. Therefore, an object of the present invention is to provide an optical multi-axis optoelectronic sensor, in which an appropriate detection sensitivity can be set according to a distance between sensor heads, so as to prevent any mutual interference with another optoelectronic sensor.

Other objects, functions and effects of the present invention will be readily understood by one skilled in the art by referring to the description of the following specification.

In order to achieve the above-described object, on the assumption of an optical multi-axis optoelectronic sensor according to the present invention, in which a phototransmitting sensor head having a plurality of phototransmitters arranged thereon and a photoreceiving sensor head having a plurality of photoreceivers arranged thereon are disposed opposite to each other, the optical multi-axis optoelectronic sensor comprises: first device for inputting distance data equivalent to a distance between the sensor heads; second device for determining detection sensitivity based on the distance data input by the first device; and third device for setting the detection sensitivity determined by the second device.

The input "distance data" is data corresponding to the distance between the sensor heads, and includes not only a value indicating an actual distance (a distance value) but also distance data in various modes in conformity with a substantial distance value such as data specifying a distance range.

"To determine the detection sensitivity based on the distance data" signifies to specify, calculate or the like the detection sensitivity based on the distance data in accordance with a predetermined rule. For example, the detection sensitivity is determined by applying the distance data to a predetermined conversion formula or a rule database, or the detection sensitivity is determined in reference to a conversion table storing therein the distance data and the detection sensitivity which are previously assigned to each other. Incidentally, in the case where the conversion formula, the rule database or the conversion table is used, the contents can be varied or rewritten as a mere design option within the reach of one skilled in the art.

Here, as for "the detection sensitivity", the variations (i.e., the adjustment) of the detection sensitivity signifies the variations (i.e., the adjustment) of phototransmitting intensity, a photoreceiving signal amplification ratio, a photoreceiving judgment threshold and the like.

According to the above-described present invention, if the second device has been previously designed in such a manner as to determine an appropriate detection sensitivity according to the distance between the sensor heads corresponding to the distance data, the appropriate detection sensitivity can be instantly set only by inputting the distance data via the first device. Furthermore, in the case where the detection sensitivity is prescribed based on the phototransmitting intensity, the photoreceiving signal amplification ratio and the photoreceiving judgment threshold, it is possible to avoid setting excessive phototransmission, excessive amplification or a too small photoreceiving judgment threshold, thereby contributing to the prevention of mutual interference with another optoelectronic sensor.

According to the present invention, it is preferable that the second device should determine the detection sensitivity in reference to a conversion table storing therein the distance data and the detection sensitivity which previously correspond to each other, and further, that the distance data and the phototransmitting intensity should correspond to each other in the conversion table in such a manner that the phototransmitting intensity becomes higher as the distance between the sensor heads is greater while the phototransmitting intensity becomes lower as the distance between the sensor heads is smaller.

In such an aspect, the phototransmitting intensity is set according to the distance between the sensor heads, thereby preventing any mutual interference caused by the excessive phototransmission while keeping the intensity required for the detection judgment by the sensor per se.

Moreover, according to the present invention, it is preferable that the second device should determine the detection sensitivity by specifying any one or more of phototransmitting intensity, a photoreceiving signal amplification ratio and a photoreceiving judgment threshold based on the distance data input by the first device, and further, that the second device should be designed to determine the phototransmitting intensity, the photoreceiving signal amplification ratio and the photoreceiving judgment threshold such that a photoreceiving signal level after amplification obtained when each of the pairs of phototransmitters and photoreceivers is disposed opposite to each other coaxially on an optical axis at the distance between the sensor heads equivalent to the distance data input by the first device becomes a predetermined magnification which is equal to or greater than the photoreceiving judgment threshold and three times or less the photoreceiving judgment threshold.

Here, "to design" signifies to previously set, for example, the above-described predetermined conversion formula or rule database, the conversion table or the like in such a manner.

Incidentally, in the phrase "equal to or greater than the photoreceiving judgment threshold and three times or less the photoreceiving judgment threshold", the prescribed range includes substantially effective values suitable for the detection judgment which has been found by the present inventors. With an earnest study made by the present inventors, within the above-described prescribed range, a photoreceiving signal level higher than the photoreceiving judgment threshold cannot be obtained on either one of the optical axes in most cases when the optical axes are not appropriately disposed opposite to each other. Consequently, in setting the detection sensitivity, it is possible to avoid a situation in which the detection sensitivity is set while the optical axes remain misaligned, by definitely describing the magnitude relationship between the photoreceiving judgment threshold and a lowest photoreceiving signal level by the use of a display or the like or definitely describing that the photoreceiving signal level of either one of the optical axes falls out of the above-described prescribed range.

Next, according to the present invention, it is preferable that the first device should be implemented by an external setter which is connected to a communication cable for connecting the phototransmitting sensor head and the photoreceiving sensor head to each other.

Here, "the communication cable" may be a communication cable integrated with a signal line for synchronizing phototransmitting and photoreceiving timings. Moreover, "the external setter" has at least distance data input device such as an operator.

In such an aspect, the sensor head can be designed in compactness and light weight in comparison with the case where the sensor head is provided with the distance data input device. Additionally, the configuration of the distance data input device (e.g., the arrangement of a switch, a button or the like) can be variously designed, as required, without giving any adverse influence on the shape, configuration and the like of the sensor head by implementing the first device by the use of the external setter.

According to the present invention, it is preferable that the conversion table storing therein the distance data and the detection sensitivity which previously correspond to each other should be stored in a predetermined memory in the external setter, and thus, the detection sensitivity is determined in reference to the conversion table.

"The predetermined memory" herein includes an internal memory in a CPU in addition to an external memory in the CPU.

In such an aspect, a series of processing from inputting of the distance data to acquirement of the detection sensitivity can be performed by the external setter. Incidentally, also in this case, the contents of the conversion table can be appropriately rewritten (i.e., varied).

According to the present invention, in the case where the first device and the second device are implemented by the external setter, as described above, it is preferable that the phototransmitting sensor head should include phototransmitting intensity setting device for adjusting the phototransmitting intensity from the phototransmitter, and further, the photoreceiving sensor head should include photoreceiving signal amplification ratio setting device for adjusting the photoreceiving signal amplification ratio from the photoreceiver and photoreceiving judgment threshold setting device for adjusting the photoreceiving judgment threshold, wherein each of the sensor heads sets the phototransmitting intensity, the photoreceiving signal amplification ratio and the photoreceiving judgment threshold in response to a signal from the external setter via the communication cable.

The optical multi-axis optoelectronic sensor in the above-described aspect is expressed in other words, as follows:

An optical multi-axis optoelectronic sensor comprises: a phototransmitting sensor head having a plurality of phototransmitters and device for adjusting phototransmitting intensity from the phototransmitter; a photoreceiving sensor head having a plurality of photoreceivers, device for adjusting photoreceiving signal amplification ratio and device for adjusting photoreceiving judgment threshold; a communication cable for connecting the phototransmitting sensor head and the photoreceiving sensor head to each other; and an external setter having device connected to the communication cable, for inputting distance data equivalent to a distance between the sensor heads, and a conversion table storing therein phototransmitting intensity, a photoreceiving signal amplification ratio and a photoreceiving judgment threshold corresponding to the distance data; wherein the phototransmitting intensity, the photoreceiving signal amplification ratio and the photoreceiving judgment threshold determined by collating the distance data input via the external setter with the conversion table are set as adjustment values in each of the sensor heads.

In the optical multi-axis optoelectronic sensor in the above-described aspect, the detection sensitivity (i.e., the phototransmitting intensity, the photoreceiving signal amplification ratio and the photoreceiving judgment threshold) is determined in reference to the conversion table stored in an internal memory in the external setter by inputting the distance data into the external setter. Thereafter, a signal for setting the determined phototransmitting intensity, photoreceiving signal amplification ratio and photoreceiving judgment threshold in each of the sensor heads is transmitted to each of the sensor heads via the communication cable, thereby setting the detection sensitivity.

In the above-described aspect, the appropriate detection sensitivity (i.e., the phototransmitting intensity, the photoreceiving signal amplification ratio and the photoreceiving judgment threshold) previously determined according to the distance can be instantly set in each of the sensor heads only by inputting the distance data equivalent to the distance between the sensor heads via the external setter. As a consequence, it is possible to avoid setting excessive phototransmitting intensity, excessive photoreceiving signal amplification or a too small photoreceiving judgment threshold, thereby contributing to the prevention of mutual interference with another optoelectronic sensor.

As is clear from the above description, in the optical multi-axis optoelectronic sensor according to the present invention, the appropriate detection sensitivity can be set according to the distance between the sensor heads. Thus, it is possible to provide the optical multi-axis optoelectronic sensor, in which the mutual interference with another optoelectronic sensor can be prevented.

BRIEF DESCRIPTION OF THE DRAWINGS

FIG. 11 shows a table illustrating one example of the contents of a conversion table.

DESCRIPTION OF THE PREFERRED EMBODIMENTS

A description will be given below of an optical multi-axis optoelectronic sensor in a preferred embodiment according to the present invention in reference to the attached drawings. Here, the preferred embodiment below is a merely one example according to the present invention. It is to be understood that the subject matter of the present invention should be defined only by the scope of claims for a patent.

Figure 1:
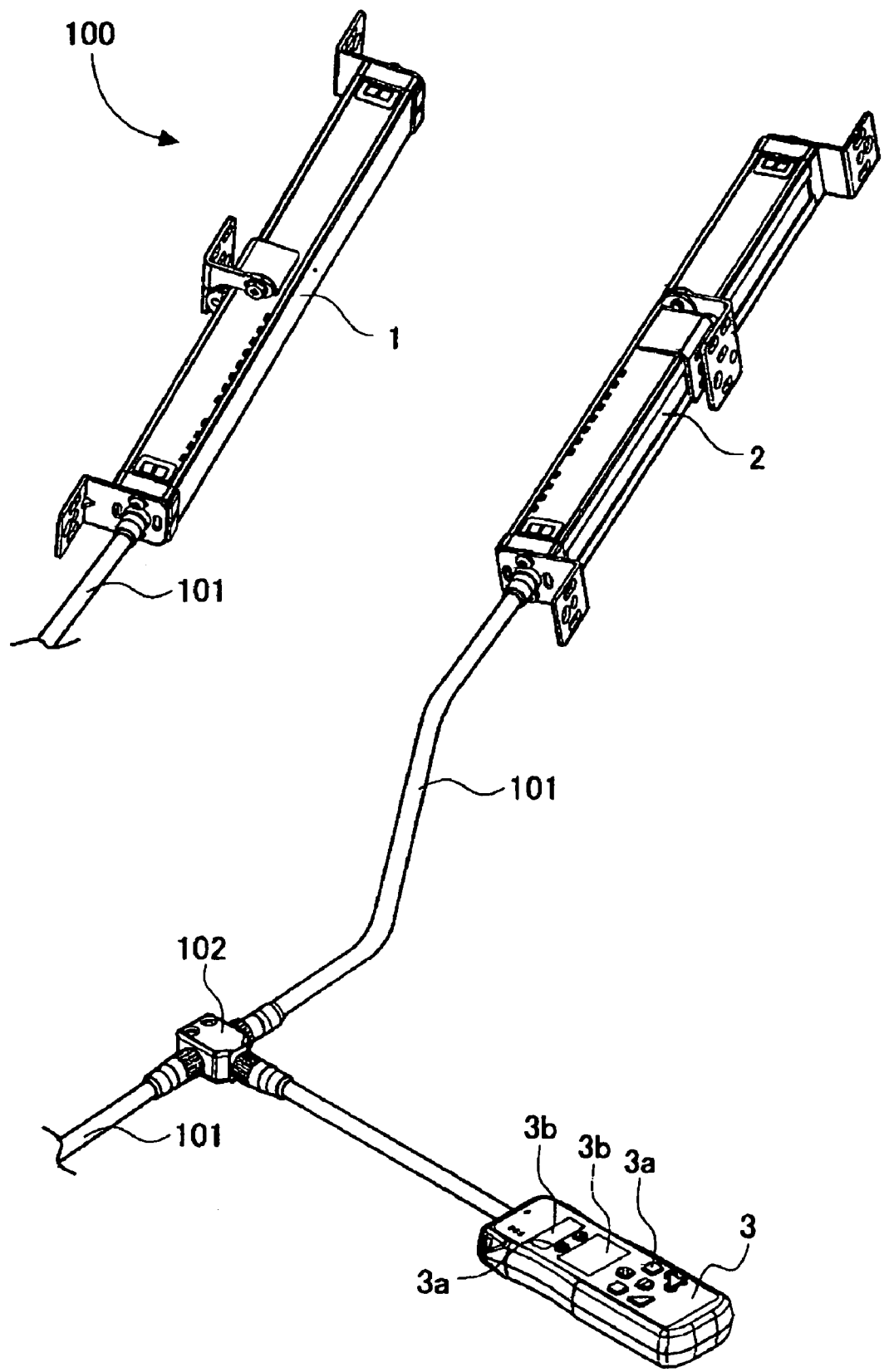
FIG. 1 shows a view showing the outside appearance (the entire configuration) of an optical multi-axis optoelectronic sensor according to the present invention.

FIG. 1 shows a view showing the outside appearance of the configuration of an optical multi-axis optoelectronic sensor 100 in the present preferred embodiment. As shown in FIG. 1, the optical multi-axis optoelectronic sensor in the present preferred embodiment is configured such that a phototransmitting sensor head 1 and a photoreceiving sensor head 2 are connected via a communication cable 101. Moreover, an external setter 3 is connected to the communication cable 101 via a connector 102. A wiring box or the like for supplying electric power is interposed between the connector 102 and the phototransmitting sensor head 1, although its illustration is omitted.

The external setter 3 includes operating portions 3a, each of which is constituted of a plurality of pushbutton switches, and display portions 3b, each of which is constituted of a liquid crystal display. In the present preferred embodiment, phototransmitting intensity from the phototransmitting sensor head 1 and a photoreceiving signal amplification ratio and a photoreceiving judgment threshold from the photoreceiving sensor head 2 can be set via the external setter 3. Furthermore, the phototransmitting intensity, photoreceiving intensity, the photoreceiving judgment threshold and the like at a certain timing are displayed on the display portions 3b. The detailed circuit arrangement and the like will be described later.

Figure 2:
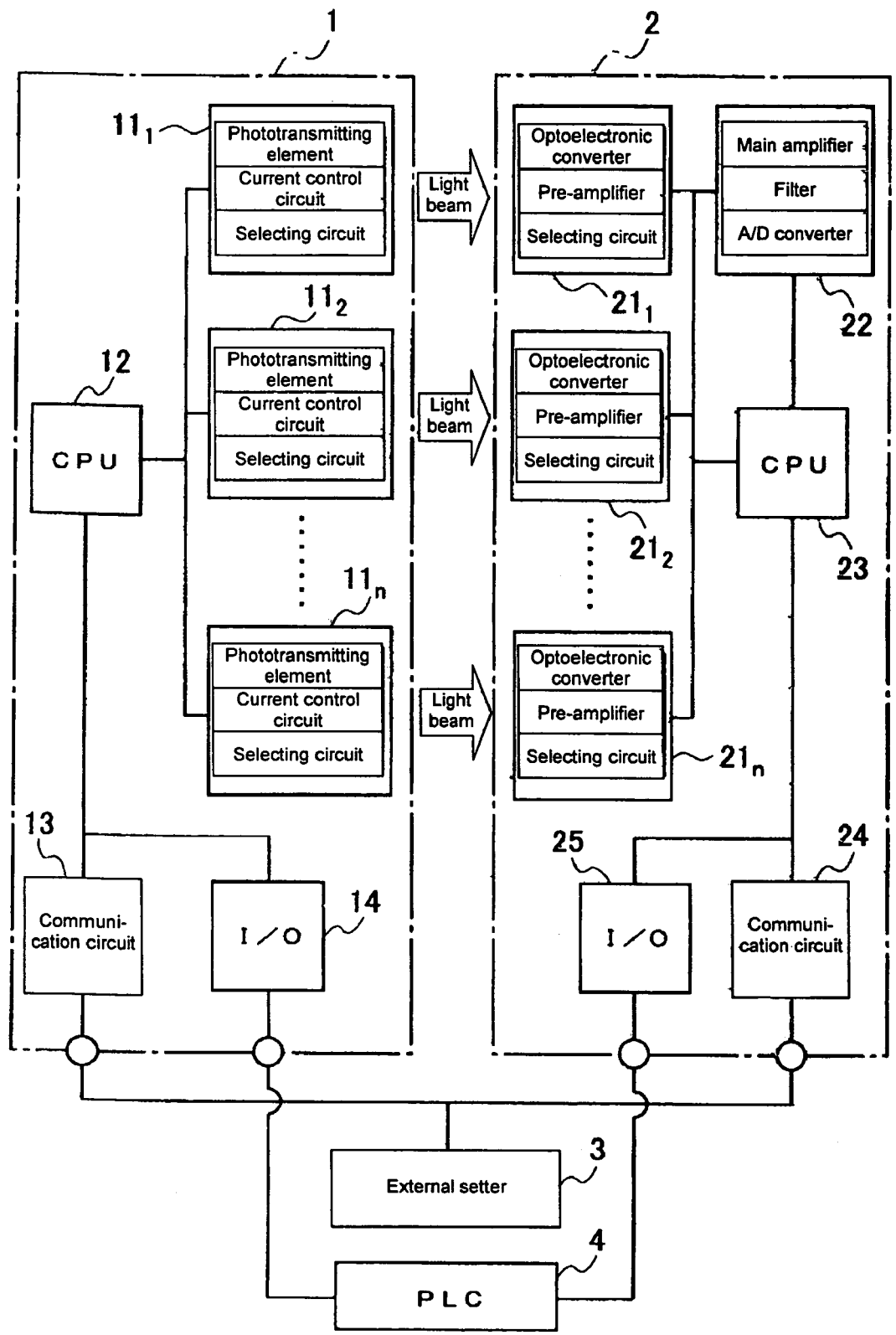
FIG. 2 shows a diagram illustrating the circuit arrangement of main units (i.e., phototransmitting and photoreceiving sensor heads) in the optical multi-axis optoelectronic sensor according to the present invention.

FIG. 2 shows a diagram illustrating the circuit arrangement of main units (i.e., the sensor heads) in the optical multi-axis optoelectronic sensor in the present preferred embodiment. As illustrated in FIG. 2, the phototransmitting sensor head 1 includes: n phototransmitters 11 ($11_1$ to $11_n$), each of which has a phototransmitting element, a current control circuit and an optical axis selecting circuit; a CPU 12 for generating a drive signal and the like for each of the phototransmitters 11; a communication circuit 13 for performing communications with the photoreceiving sensor head 2 and with the external setter 3; and an I/O interface 14 for performing communications with a host apparatus (a PLC in this preferred embodiment).

In contrast, the photoreceiving sensor head 2 includes: photoreceivers 21 ($21_1$ to $21_n$), each of which has an optoelectronic converter containing a photoreceiving element therein, a pre-amplifier for amplifying a photoreceiving signal output from the photoreceiving element and an optical axis selecting circuit; a signal processor 22 having a main amplifier, a filter (a high pass filter or a comb filter) and an A/D converter; a CPU 23 for generating a drive signal and the like for each of the photoreceivers 21 and performing calculation for detection judgment in response to a signal output from the signal processor 22; a communication circuit 24 for performing communications with the phototransmitting sensor head 1 and with the external setter 3; and an I/O interface 25 for performing communications with the host apparatus (the PLC in this preferred embodiment).

Figure 3:
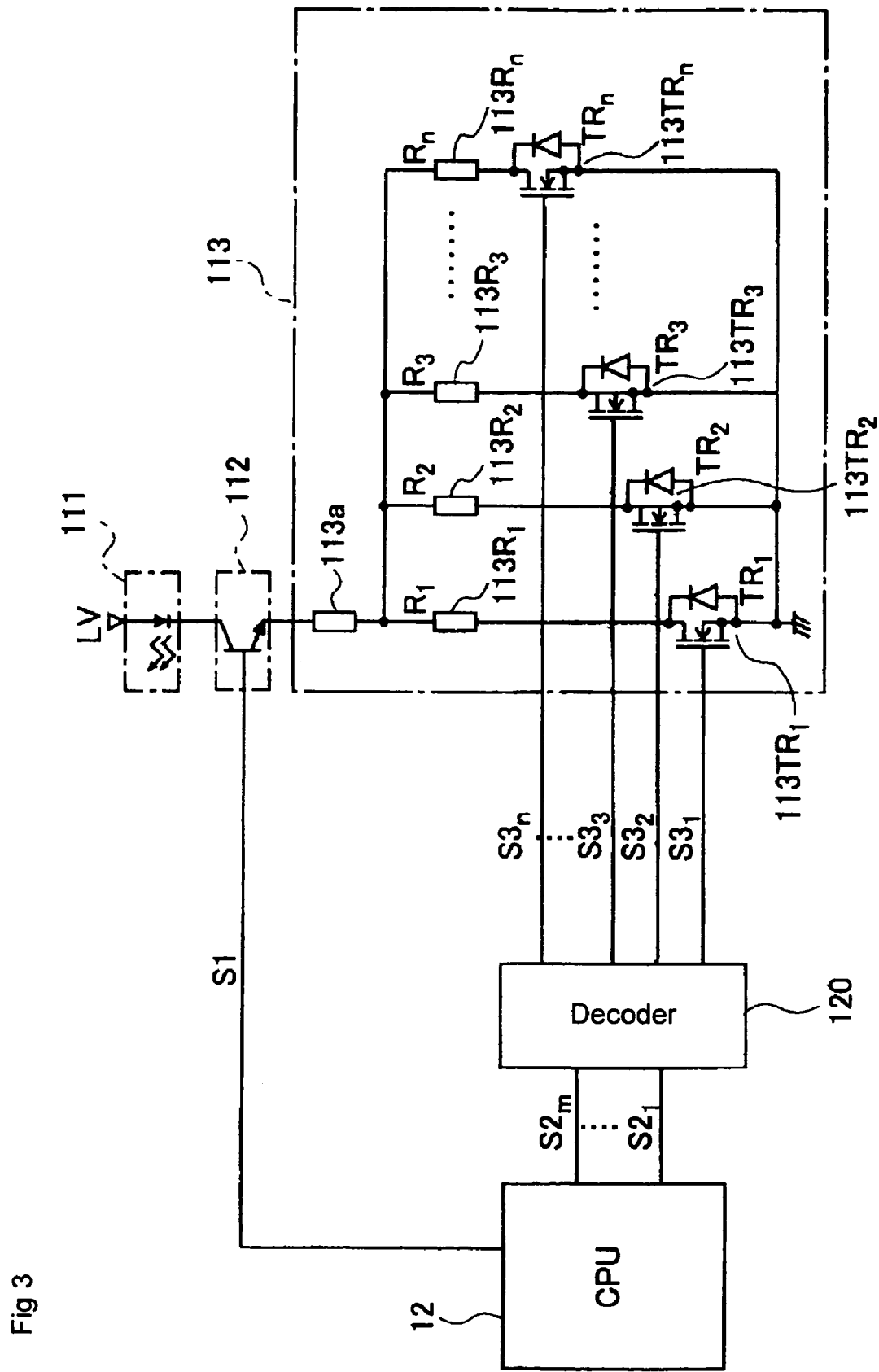
FIG. 3 shows a diagram illustrating the circuit arrangement of the phototransmitting sensor head in detail.

FIG. 3 shows a diagram illustrating the circuit arrangement of the phototransmitting sensor head 1 in detail. As illustrated in FIG. 3, each of the phototransmitting sensor heads 1 is configured by including: a phototransmitting element 111 for emitting an infrared light beam (or a red light beam); a transistor (an optical axis selecting circuit) 112, in which the drive signal (i.e., an optical axis selecting signal) output from the CPU so as to drive the phototransmitting element 111 is input into a base terminal; a current control circuit 113 for adjusting the phototransmitting intensity of a light beam from the phototransmitting element 111 in response to the signal output from the CPU; the CPU 12 having an internal memory; and a decoder 120 for connecting m signal input lines from the CPU 12 to n output lines.

Here, the n phototransmitters 11 are actually connected to the CPU 12 via the signal lines with the same configuration, as illustrated in FIG. 2, although the phototransmitter integrally connected to the CPU 12 is illustrated in FIG. 3.

As is clear from FIG. 3, each of the n phototransmitters 11 illustrated in FIG. 2 is selectively driven via the transistor 112 in response to an optical axis selecting signal (S1) output from the CPU 12.

Moreover, the current control circuit 113 is configured by including n FETs (the acronym of field-effect transistors) connected in parallel to the transistor 112 via a main resistor 113a. Here, reference numerals $113R_1$, $113R_2$, $113R_3$ to $113R_n$ designate resistors having different resistances, interposed between the main resistor 113a and the FETs, respectively.

Each of the FETs ($113TR_1$, $113TR_2$, $113TR_3$ to $113TR_n$) is adapted to receive a drive signal (S3) from the decoder 120. That is to say, a plurality ($2^m$) of signals (S2) in 2-bit with respect to each of the signal lines can be input from the CPU 12 to the decoder 120, so that the n signals (S3) for selectively driving the n FETs are output from the decoder. As is understood from this, each of the phototransmitters 11 can select n phototransmitting intensities (i.e., phototransmitting currents) via the FETs ($113TR_1$, $113TR_2$, $113TR_3$ to $113TR_n$) and the resistors ($113R_1$, $113R_2$, $113R_3$ to $113R_n$). As described later, a setting value of the phototransmitting intensity specified via the external setter 3 is stored in the internal memory in the CPU 12.

Figure 4:
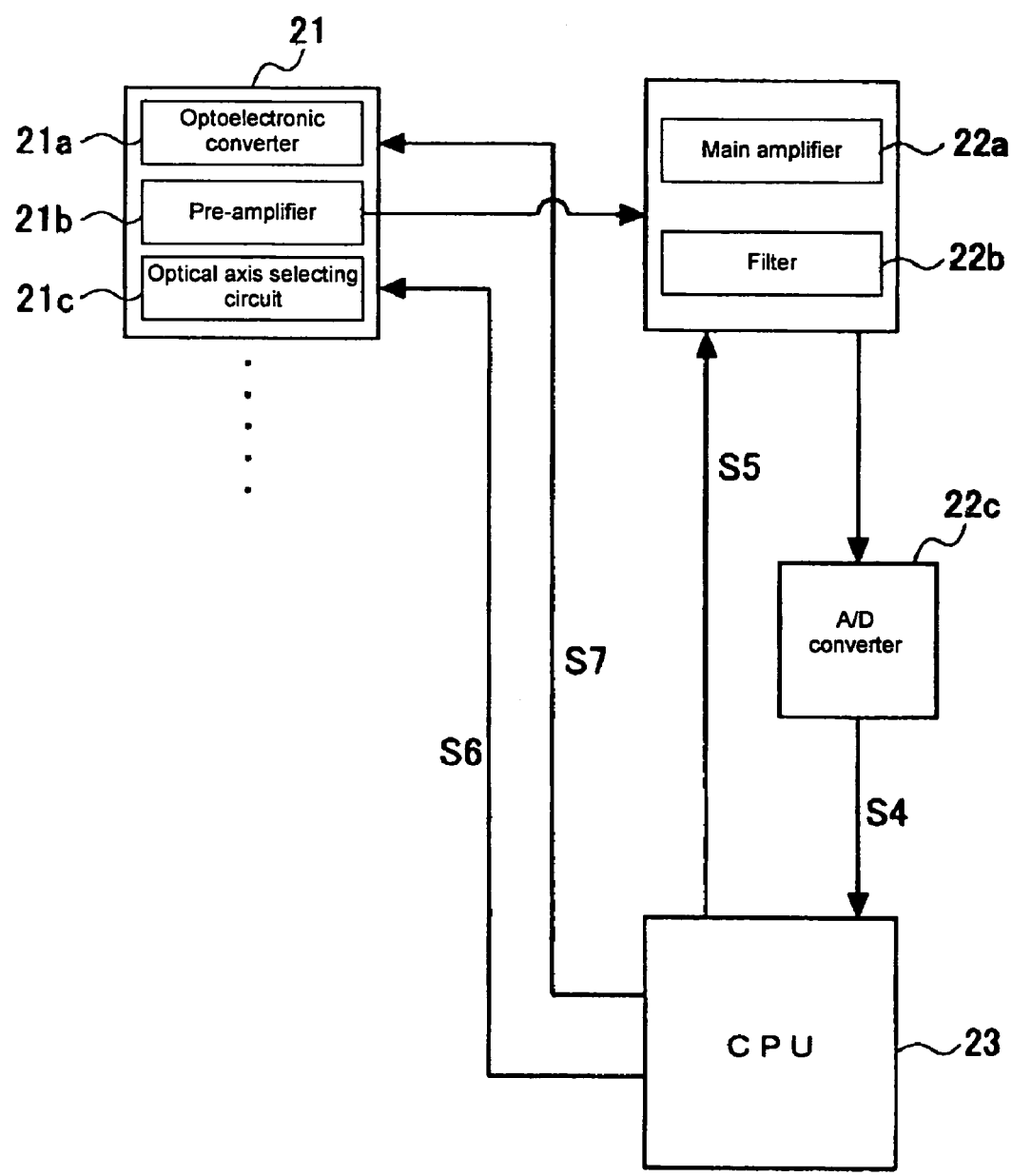
FIG. 4 shows a diagram illustrating the circuit arrangement of the photoreceiving sensor head in detail.

FIG. 4 shows a diagram illustrating the circuit arrangement of the photoreceiving sensor head 2 in detail. As illustrated in FIG. 4, each of the photoreceiving sensor heads 2 is mainly configured by: the photoreceiver 21 having an optoelectronic converter 21a, a pre-amplifier 21b and an optical axis selecting circuit 21c; and the CPU 23, which receives, through an A/D converter 22c, a photoreceiving signal generated by filtering, by a filter 22b, a photoreceiving signal generated by amplifying a photoreceiving signal from the pre-amplifier 21, so as to perform detection judgment processing based on a level of the photoreceiving signal.

The CPU 23 includes an internal memory, in which a setting value of a photoreceiving judgment threshold specified via the external setter 3 is stored, as described later. The detection judgment processing is performed by comparing the photoreceiving judgment threshold with a photoreceiving signal (S4) output from the signal processor 22.

Moreover, the CPU 23 outputs an n-bit signal (S5) for prescribing a photoreceiving signal amplification ratio in the main amplifier 22a. In other words, in present preferred embodiment, the main amplifier 22a can set $2^n$ photoreceiving signal amplification ratios in response to the n-bit signal (S5). Here, the photoreceiving signal amplification ratio also is set via the external setter 3, as described later, and then, the setting value is stored in the internal memory in the CPU 23.

Furthermore, the CPU 23 is adapted to output an optical axis selecting signal (S6) for selectively driving the photoreceiving element in the optoelectronic converter 21a via the optical axis selecting circuit 21c having the transistor, not illustrated, and a gate control signal (S7) for instructing effectiveness of the photoreceiving signal (i.e., a gate is open).

Figure 5:
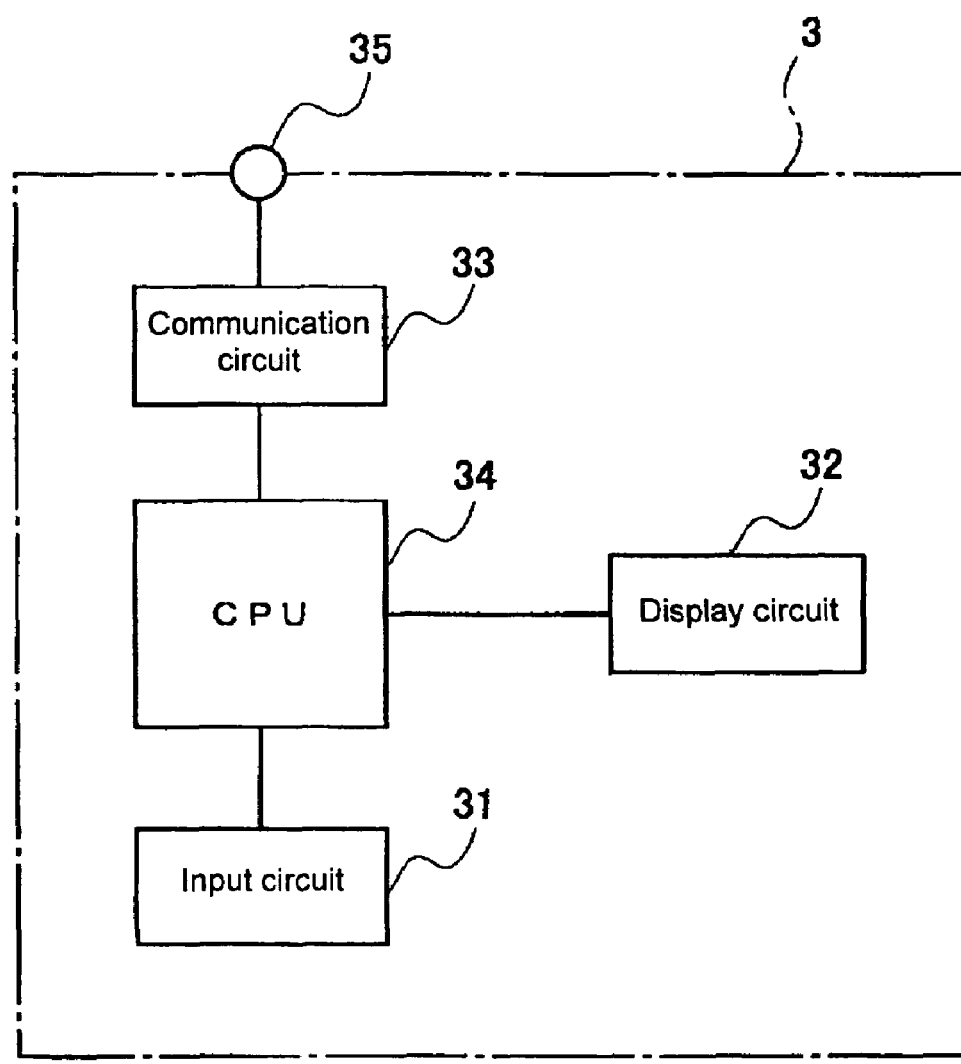
FIG. 5 shows diagram illustrating the circuit arrangement of an external setter.

FIG. 5 shows a diagram illustrating the circuit arrangement of the external setter 3 in detail. As illustrated in FIG. 5, the external setter 3 includes: an input circuit 31 corresponding to the operating portion 3a shown in FIG. 1; a display circuit 32 corresponding to the display portion 3b shown in FIG. 1; a communication circuit 33 for performing communications with the phototransmitting sensor head 1 and the phototransmitting sensor head 2; and a CPU 34 for centrally controlling the input circuit 31, the display circuit 32 and the communication circuit 33. The CPU 34 has an internal memory, in which a conversion table (see FIG. 11), described later, is stored. In FIG. 5, reference numeral 35 designates a connecting terminal for the communication cable.

Figure 6:
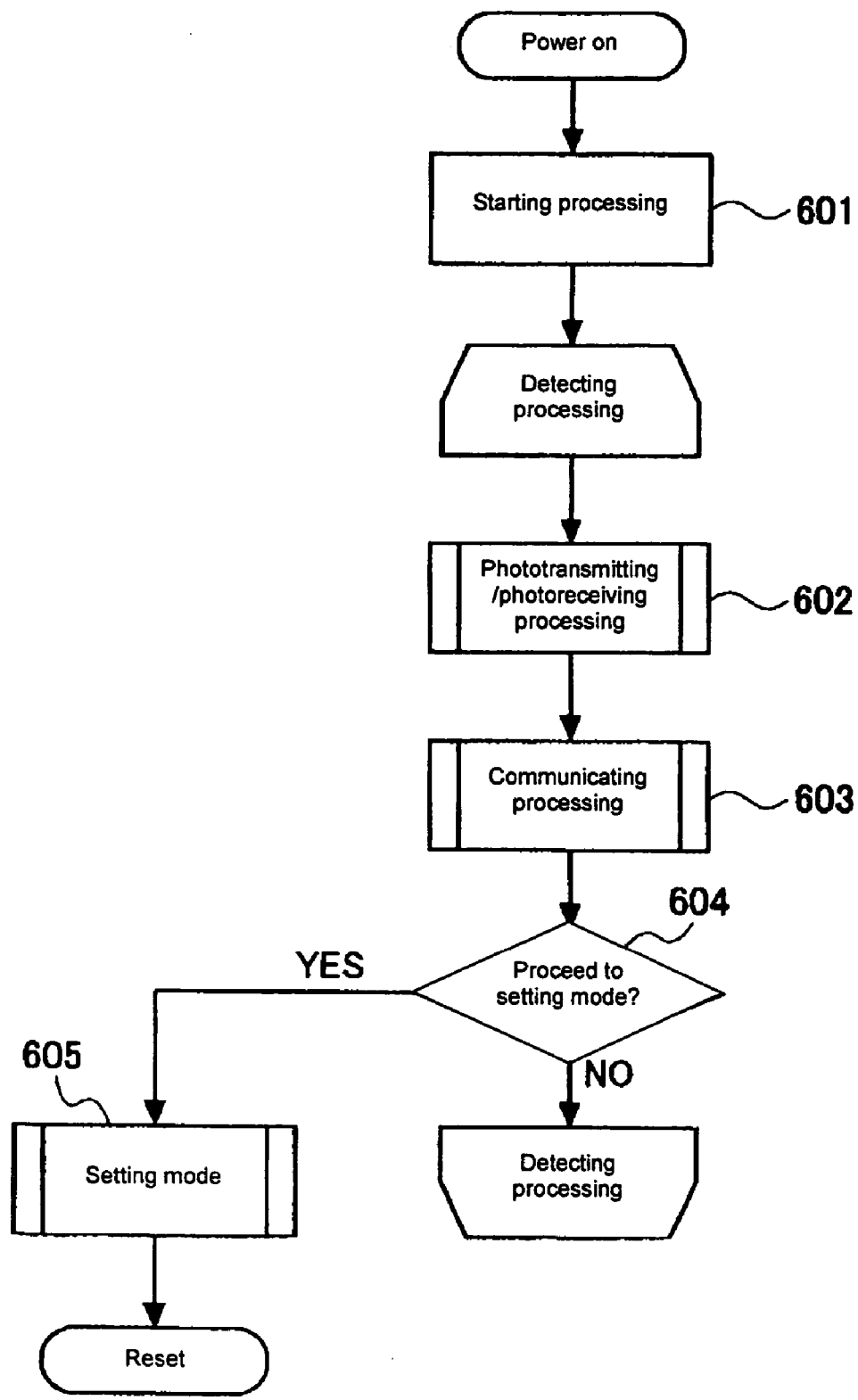
FIG. 6 shows a general flowchart schematically illustrating the operational contents of the optical multi-axis optoelectronic sensor according to the present invention.

Next, FIG. 6 shows a general flowchart schematically illustrating the operational contents of the optical multi-axis optoelectronic sensor in the present preferred embodiment.

As illustrated in the flowchart in FIG. 6, upon turning on a power source, starting processing such as initialization of the sensor head and the memory in the external setter is first executed in the optical multi-axis optoelectronic sensor in the present preferred embodiment (step 601). Upon completion of the starting processing, detecting processing is executed next. The detecting processing is executed by repeating predetermined times phototransmitting/photoreceiving processing (step 602) and communicating processing (step 603) for performing communications among the phototransmitting sensor head 1, the photoreceiving sensor head 2 and the external setter 3 or communications between the phototransmitting sensor head 2 and a photoreceiving sensor head in another optical multi-axis optoelectronic sensor (in the case where the optical multi-axis optoelectronic sensors are arranged together). Incidentally, after completion of the communicating processing (step 603) in the present preferred embodiment, it is determined as to whether or not a control routine proceeds to a setting mode, in which the photoreceiving judgment threshold, the phototransmitting intensity, the photoreceiving signal amplification ratio and the like are set (step 604). In this embodiment, upon receipt of an input of a predetermined setting starting signal from the external setter 3 (YES in step 604), the control routine proceeds to the setting mode (step 605).

Figure 7:
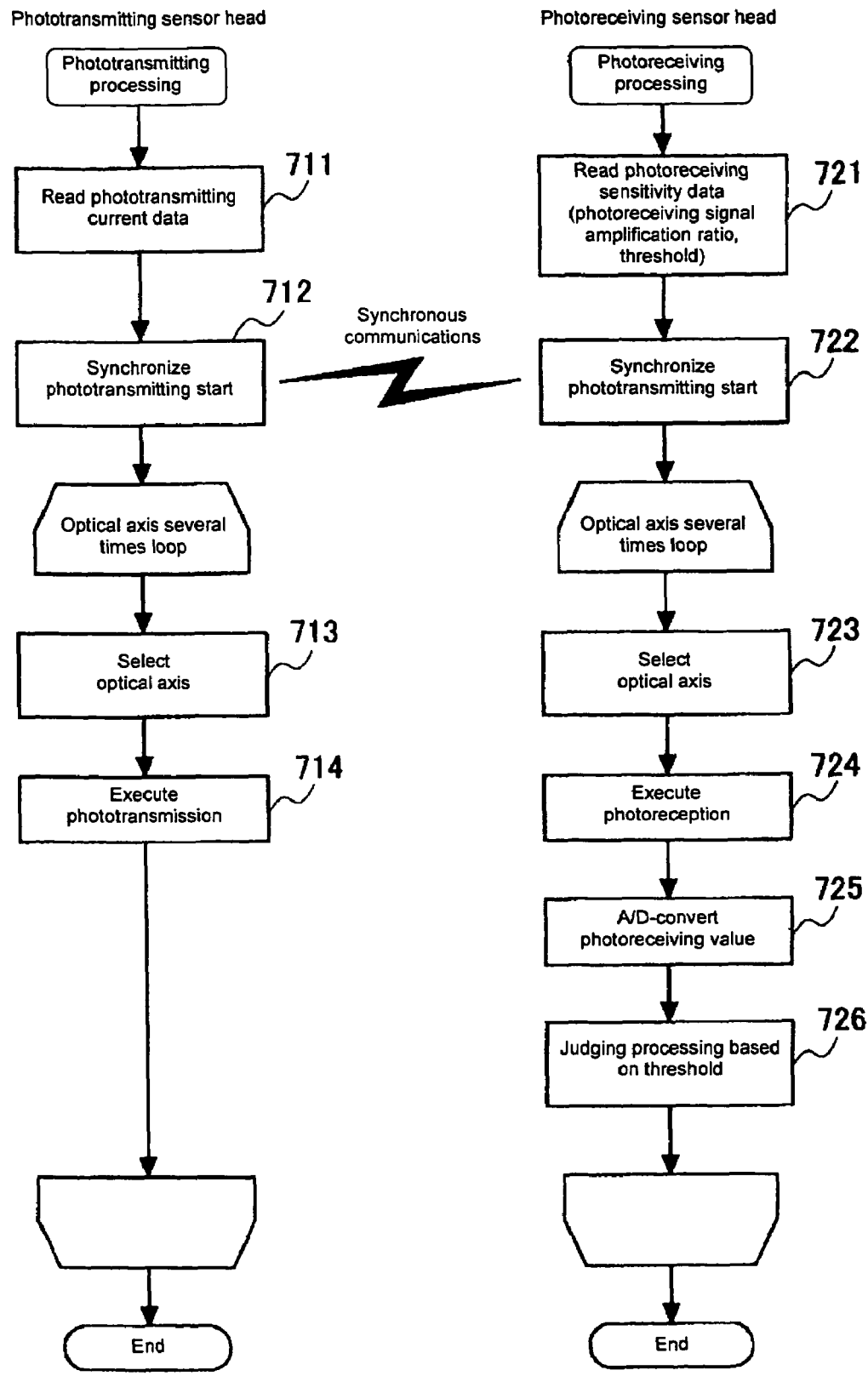
FIG. 7 shows a flowchart illustrating phototransmitting/photoreceiving processing in detail.

FIG. 7 shows a flowchart illustrating the detailed phototransmitting/photoreceiving processing described in step 602. In FIG. 7, processing in the phototransmitting sensor head 1 (steps 711 to 714) and processing in the photoreceiving sensor head 2 (steps 721 to 726) are illustrated in parallel to each other. In the phototransmitting/photoreceiving processing in the phototransmitting sensor head 1, the CPU 12 first reads a setting value of the phototransmitting intensity (i.e., phototransmitting current data) from the internal memory (step 711), thereby determines the FET drive signal output (S3) from the decoder 120 illustrated in FIG. 3. In contrast, in the photoreceiving sensor head 2, the CPU 23 first reads setting values of the photoreceiving signal amplification ratio and the photoreceiving judgment threshold from the internal memory (step 721), thereby determines the photoreceiving signal amplification ratio specifying signal (S5) from the CPU 23 illustrated in FIG. 4 and the photoreceiving judgment threshold.

Subsequently, in the phototransmitting sensor head 1 and the photoreceiving sensor head 2, synchronous communications are performed for taking the synchronism between the phototransmitting sensor head 1 and the photoreceiving sensor head 2 through the communication cable 101 (steps 712 and 722).

Next, in the phototransmitting sensor head 1, phototransmission is performed from each of the phototransmitters 11 (step 714) by selectively driving the phototransmitters 11 in sequence based on the previously determined phototransmitting intensity (step 713). The processing is repeated predetermined times (steps 713 and 714). In the meantime, in the photoreceiving sensor head 2, the gates at the photoreceivers 21 are selectively opened in sequence on the assumption of the previously determined photoreceiving signal amplification ratio (step 723), and then, the photoreceiving signals are taken in sequence from the photoreceivers 21 (step 724). The photoreceiving signal generated in the photoreceiving processing (step 724) is A/D-converted by the A/D-converter 22c (step 725), to be thus taken into the CPU 23. The CPU 23 executes detection judgment processing (i.e., it is judged whether or not each of the optical axes receives the light beam) by comparing the taken photoreceiving signal with the previously determined photoreceiving judgment threshold (step 726).

Although not illustrated in the flowchart in FIG. 7, if it is judged in the detection judgment processing (step 726) that no photoreception is observed on either one of the optical axes in the case where the optical multi-axis optoelectronic sensor 100 is used as a light curtain, a predetermined operation in accordance with the result (for example, generation of a stop signal from equipment to be controlled) is performed. Otherwise, a predetermined operation in accordance with the result (for example, generation of a signal for specifying an object intrusion area) is executed based on the optical axis, in which no photoreception is observed, in the detection judgment processing (step 726) in the case where the optical multi-axis optoelectronic sensor is used as an area sensor. The operation after the detection judgment processing is obvious to one skilled in the art, and therefore, detailed explanation will be omitted.

Figure 8:
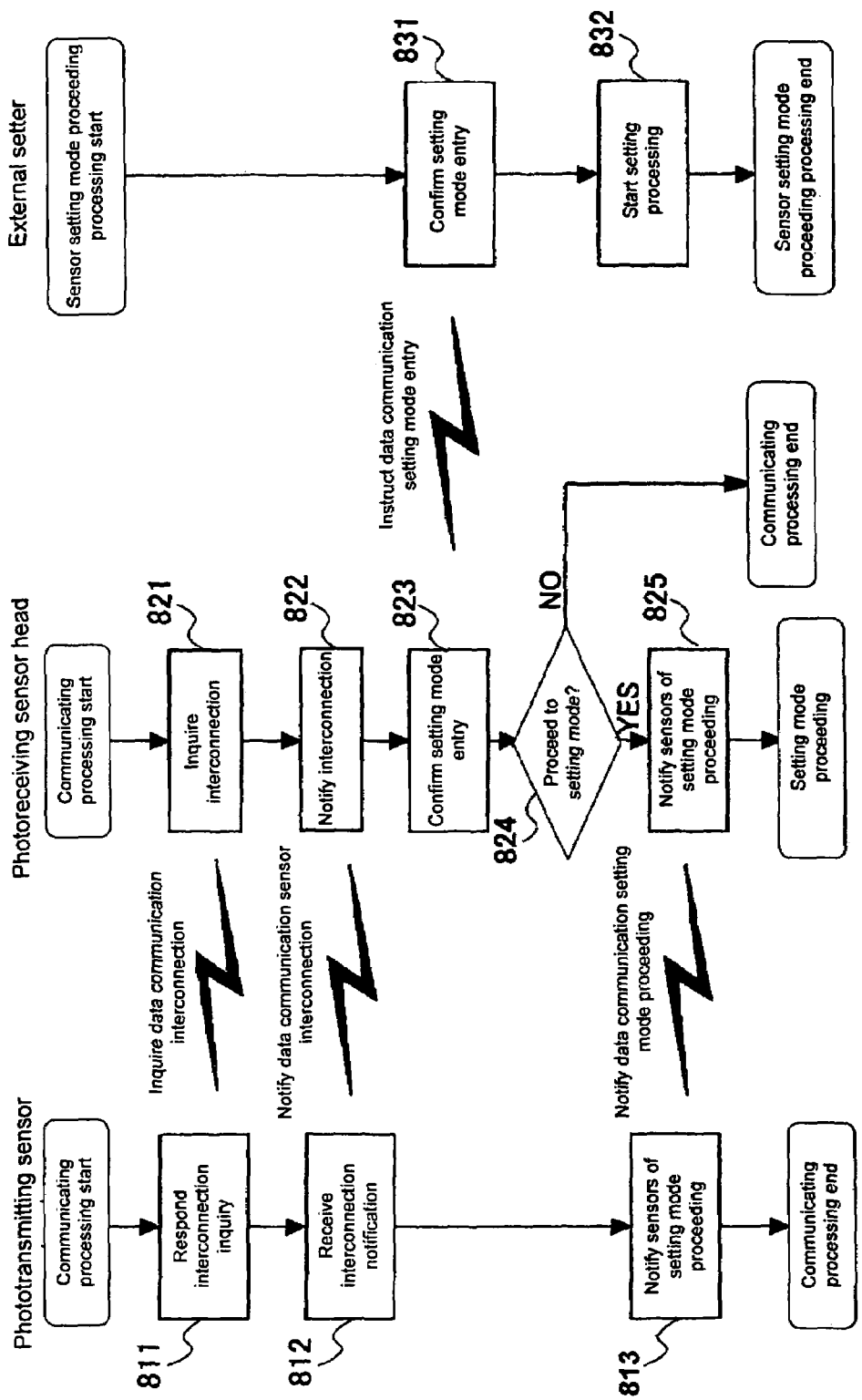
FIG. 8 shows a flowchart illustrating communicating processing in detail.

FIG. 8 shows a flowchart illustrating the detailed communicating processing described in step 603 in FIG. 6. In FIG. 8, processing in the phototransmitting sensor head 1 (steps 811 to 813), processing in the photoreceiving sensor head 2 (steps 821 to 825) and processing in the external setter 3 (steps 831 and 832) are illustrated in parallel to each other.

In the communicating processing, the photoreceiving sensor head 2 (i.e., the CPU 23) first inquires interconnection with respect to the phototransmitting sensor head 1 (i.e., the CPU 12) (step 821). The interconnection inquiry is performed by confirming the state of the phototransmitting sensor head 1 (that is, confirming a predetermined check item), confirming the state of another connected optical multi-axis optoelectronic sensor, or the like. In response to the interconnection inquiry, the phototransmitting sensor head 1 responds to the photoreceiving sensor head 2 (step 811). This response is used for notifying the photoreceiving sensor head 2 as to whether or not the phototransmitting sensor head 1 is normally operated.

Subsequently, the interconnection is notified. With the interconnection notification, a predetermined command is issued to the phototransmitting sensor head 1 according to the state of another connected optical multi-axis optoelectronic sensor (inclusive of distribution or the like of shared data). Specifically, in the case where it is confirmed that the other optical multi-axis optoelectronic sensor is stopped in operation (i.e., an abnormal operation) based on the previous interconnection inquiry (step 821), a command signal is generated for stopping the phototransmission from the phototransmitting sensor head 1. This is because the other optical multi-axis optoelectronic sensor which is normally operated also is restricted to be temporarily stopped in operation when all of the series of optical multi-axis optoelectronic sensors are not normally operated in the present preferred embodiment.

Next, communications are performed between the photoreceiving sensor head 2 and the external setter 3. The communications are performed to confirm as to whether or not a mode is proceeded to a setting mode in which various parameters such as the phototransmitting intensity, the phototransmitting signal amplification ratio and the photoreceiving judgment threshold are set (steps 831 and 823). Here, when a predetermined operation for allowing the control routine to proceed to the setting mode is performed in the external setter 3, a setting mode entry confirming signal (i.e., a setting starting signal) is sent to the photoreceiving sensor head 2 from the external setter 3 accordingly (YES in step 824). Consequently, the photoreceiving sensor head 2 notifies the phototransmitting sensor head of the matter (step 825). As a result, the phototransmitting sensor head 1 and the photoreceiving sensor head 2 proceed to the setting mode (i.e., setting processing). Incidentally, in the case where no setting starting signal is sent (NO in step 824), the control routine does not proceed to the setting processing, and thus, the processing is once ended.

Figure 9:
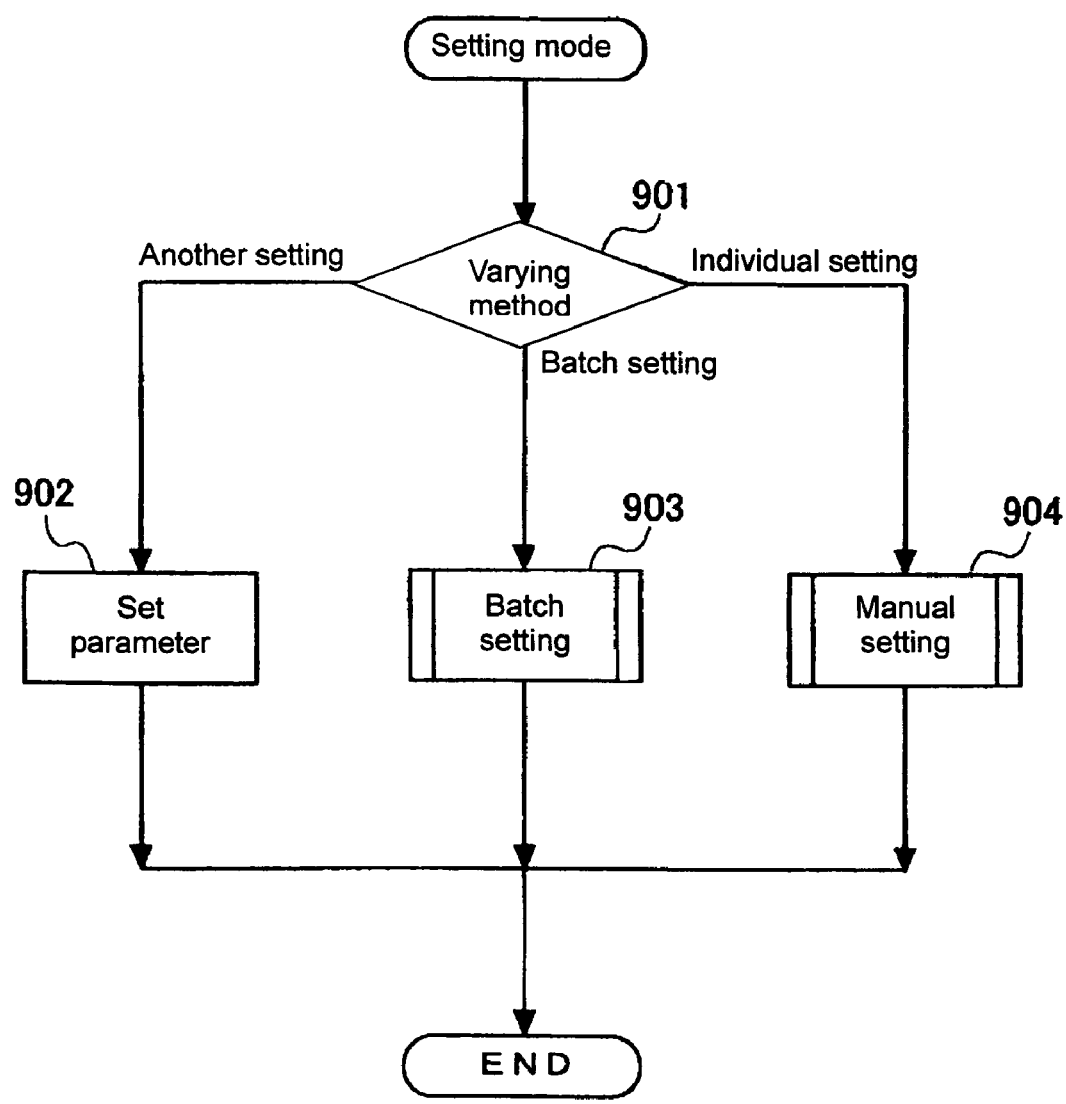
FIG. 9 shows a flowchart illustrating the contents of setting processing in detail.

FIG. 9 is a flowchart illustrating the setting processing in detail. As illustrated in FIG. 9, in the optical multi-axis optoelectronic sensor in the present preferred embodiment, the setting processing includes parameter setting for selecting a parameter relating to a basic operation such as dark-on or dark-off (step 901), batch setting processing for batch-setting the phototransmitting intensity, the photoreceiving signal amplification ratio and the photoreceiving judgment threshold in accordance with the distance between the phototransmitting sensor head 1 and the photoreceiving sensor head 2 (step 903), and manual setting (i.e., individual adjustment of the setting value determined by the operation of the external setter) (step 904).

Figure 10:
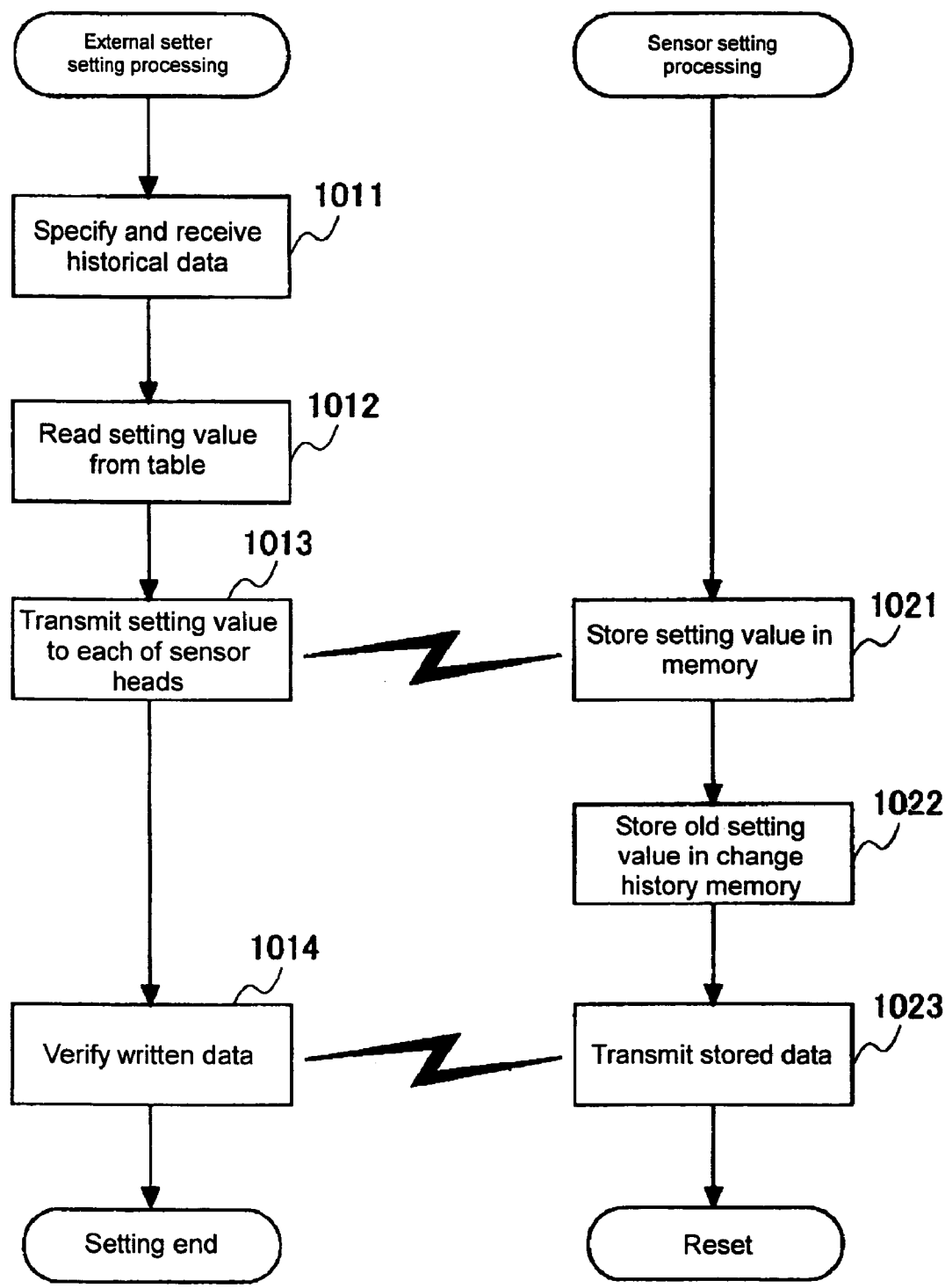
FIG. 10 shows a flowchart illustrating batch setting processing in detail.

First, a description will be given of the detailed contents of the batch-setting processing, which is the essential part of the present invention. FIG. 10 is a flowchart illustrating the contents of the batch-setting processing in detail. Here, in FIG. 10, processing by the external setter 3 (steps 1011 to 1014) and processing by the sensor units (i.e., the phototransmitting/photoreceiving sensor heads) (steps 1021 to 1023) are illustrated in parallel to each other.

The batch-setting processing is performed by the operation of the external setter 3. First, a user operates the operating portion 3a of the operating portion 3 in the external setter in accordance with determined procedures, thereby inputting a distance value between the phototransmitting sensor head 1 and the photoreceiving sensor head 2 (step 1011). The distance value is obtained by actually measuring the distance between the sensors by the user. Incidentally, the distance value input by the external setter 3 may be a substantial value (unit: meter, centimeter or millimeter), or a parameter value or the like corresponding to the distance.

Upon the input of the distance value, subsequently, the conversion table stored in the internal memory in the external setter 3 is called up, and then, the phototransmitting intensity, the photoreceiving signal amplification ratio and the photoreceiving judgment threshold are specified in reference to the conversion table (step 1012).

FIG. 11 illustrates one example of the contents of the conversion table. In the conversion table, the phototransmitting intensity, the photoreceiving signal amplification ratio and the photoreceiving judgment threshold uniquely correspond to the distance value. Specifically, as illustrated in FIG. 11, if the input distance value ranges from 500 mm to 550 mm, the phototransmitting intensity, the photoreceiving signal amplification ratio and the photoreceiving judgment threshold are specified to I1, G1 and Th1, respectively. In a similar manner, if the input distance value ranges from 551 mm to 650 mm, the phototransmitting intensity, the photoreceiving signal amplification ratio and the photoreceiving judgment threshold are specified to I2, G2 and Th2, respectively. Here, as is clear from the examples of the distance value illustrated in FIG. 11, the distance between the sensor heads can be set between 500 mm to 10,000 mm in the present preferred embodiment. Incidentally, "Manual display value" in FIG. 11 is a value used in the case where the distance value input by the external setter 3 is input as not the substantial value (unit: meter, centimeter or millimeter) but the parameter value corresponding to the distance. That is to say, both of the substantial value and the parameter value can be used as the distance value input into the external setter 3 in the present preferred embodiment.

Although not illustrated in FIG. 11, in the present preferred embodiment, the phototransmitting intensity, the photoreceiving signal amplification ratio and the photoreceiving judgment threshold previously correspond to the distance value such that the photoreceiving signal level after the amplification obtained when each of the pairs of phototransmitters 11 and photoreceivers 21 is disposed opposite to each other coaxially on the optical axes of the phototransmitter 11 and the photoreceiver 21 at the distance between the sensor heads corresponding to the input distance value in the conversion table becomes a predetermined magnification which is equal to or greater than the photoreceiving judgment threshold and three times or less the photoreceiving judgment threshold.

Here, in the phrase "equal to or greater than the photoreceiving judgment threshold and three times or less the photoreceiving judgment threshold", the specific range includes substantially effective values suitable for the detection judgment which has been found by the present inventors. Within the above-described specific range, the photoreceiving signal level higher than the photoreceiving judgment threshold cannot be obtained on either one of the optical axes in most cases when the optical axes are not appropriately disposed opposite to each other. Consequently, the present preferred embodiment is designed such that the photoreceiving judgment threshold specified by the input distance value and the lowest photoreceiving signal level obtained on either one of the optical axes are displayed on the display portion 3b in the external setter 3 in setting the detection sensitivity. In other words, in the case where the lowest photoreceiving signal level is lower than the photoreceiving judgment threshold, the optical axes can accord with each other by shifting (i.e., finely adjusting) either one of the phototransmitting sensor head and the photoreceiving sensor head in a height direction. As a consequence, it is possible to avoid a situation in which the detection sensitivity is set while the optical axes remain misaligned.

Moreover, although not illustrated in FIG. 11, in the present preferred embodiment, the distance data and the phototransmitting intensity correspond to each other in the conversion table in such a manner that the greater the distance between the sensor heads, the higher the phototransmitting intensity, while the smaller the distance between the sensor heads, the lower the phototransmitting intensity. In this manner, the phototransmitting intensity is set according to the distance between the sensor heads, thereby preventing any interference with another sensor due to excessive phototransmission while the phototransmitting intensity required for the detection judgment is maintained.

Returning to the flowchart illustrated in FIG. 10, when the phototransmitting intensity, the photoreceiving signal amplification ratio and the photoreceiving judgment threshold are specified (step 1012), data on the phototransmitting intensity setting value is transmitted from the external setter 3 to the phototransmitting sensor head 1 via the communication cable (step 1013), and then, the phototransmitting intensity setting value is written in the internal memory in the CPU 12 in the phototransmitting sensor head 1 (step 1021). At the same time, data on the photoreceiving signal amplification ratio setting value and the photoreceiving judgment threshold setting value are transmitted from the external setter 3 to the photoreceiving sensor head 2 via the communication cable (step 1013), and then, the photoreceiving signal amplification ratio setting value and the photoreceiving judgment threshold setting value are written in the internal memory in the CPU 23 in the photoreceiving sensor head 2 (step 1021).

When new setting values are written in the phototransmitting/photoreceiving sensor heads, the setting values stored therein (i.e., the old setting values) are additionally stored in a change historical region disposed in the internal memory in the CPU in each of the sensor heads. This change history is used as reference information at the time of trouble shooting in the case where an abnormality occurs in the sensor.

Next, each of the newly stored data on the setting values is transmitted via the communication cable with respect to the external setter 3 from the phototransmitting/photoreceiving sensor heads (step 1023). The external setter 3 confirms as to whether or not each of the setting values determined by the previously input distance value is normally written by each of the sensor heads based on the received data on the setting values (step 1014). Thus, the batch-setting processing is once ended.

Figure 12:
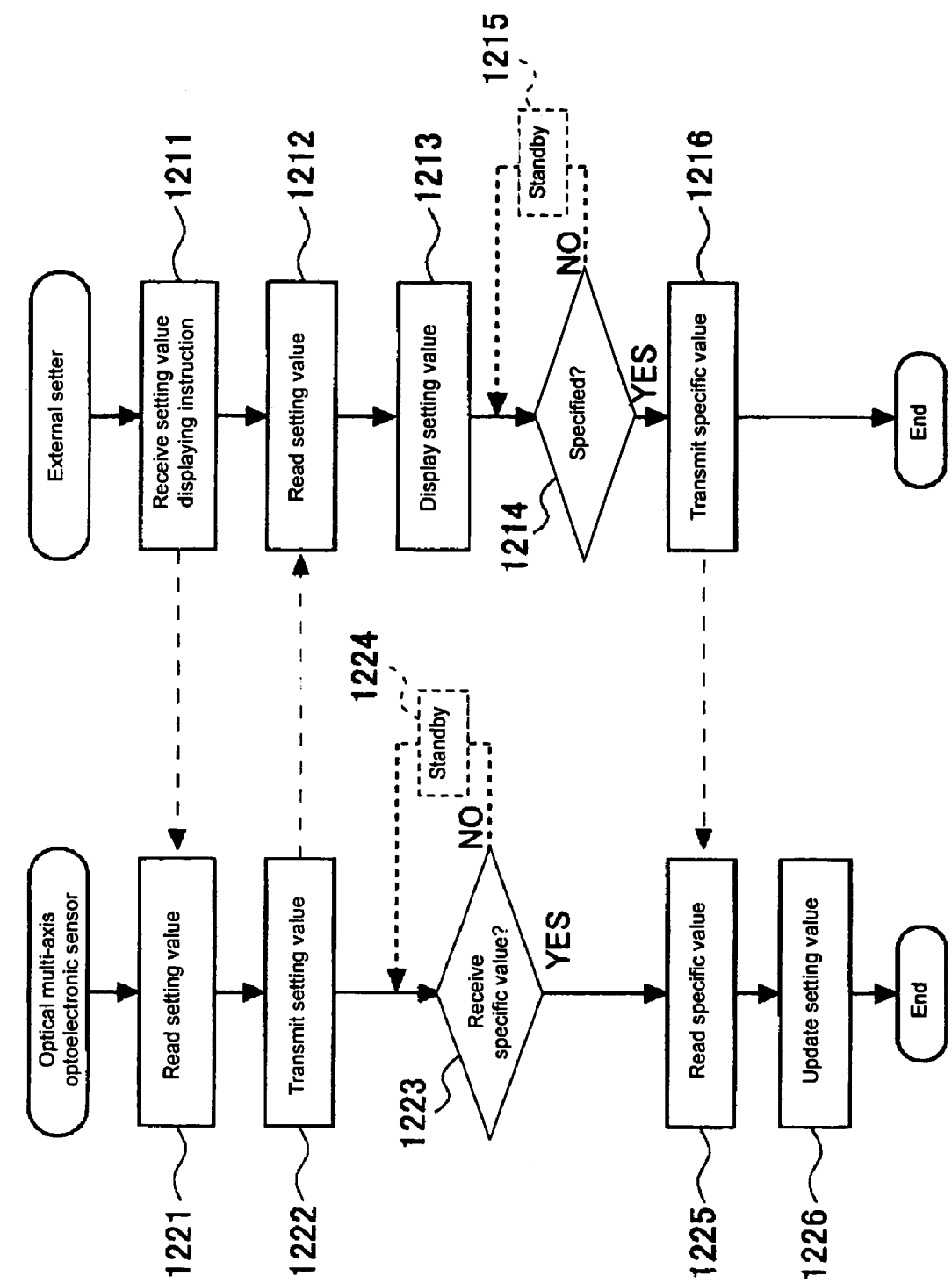
FIG. 12 shows a flowchart illustrating individual setting processing in detail.

Subsequently, the detailed individual setting processing illustrated in the flowchart in FIG. 9 will be explained in reference to a flowchart illustrated FIG. 12. Here, in the flowchart in FIG. 12, processing by the sensor units (i.e., the phototransmitting/photoreceiving sensor heads) and processing by the external setter 3 are illustrated in parallel to each other.

When the user depresses the operating portion 3a in the external setter 3 to perform operation for the setting processing proceeding, the external setter 3 notifies the optical multi-axis optoelectronic sensor (in the present preferred embodiment, the CPU 23 in the photoreceiving sensor head 2) of the matter via the communication cable 101 (step 1211).

When the CPU 23 in the photoreceiving sensor head 2 receives the notification of the setting processing proceeding, it inquiries the CPU 12 in the phototransmitting sensor head 1, so as to call up the phototransmitting intensity setting value set at that time, and further, reads the setting values of the photoreceiving signal amplification ratio and the photoreceiving judgment threshold stored in its own internal memory (step 1221), so as to notify the external setter 3 of the data on the setting values (step 1222). In this manner, the various setting values set at that time are displayed on the displaying portion 3b in the external setter 3 (steps 1212 and 1213). Thus, the CPU 23 in the photoreceiving sensor head 2 and the external setter 3 temporarily stand by (NO in step 1223 to step 1224, and NO in step 1214 to step 1215).

In this state, when the user specifies the various setting values (i.e., the phototransmitting intensity, the photoreceiving signal amplification ratio and the photoreceiving judgment threshold) by operating the operating portion 3a of the external setter 3 (YES in step 1214), the specified data on the setting values is notified to the CPU 23 (step 1216).

The CPU 23 reads the notified specified value (step 1225), and then, updates and sets the notified specified value as a new setting value (step 1226). In the case where a change in the phototransmitting intensity setting value is instructed, new data on the phototransmitting intensity setting value is transmitted from the CPU 23 to the CPU 12 in the phototransmitting sensor head 1.

In this manner, the present preferred embodiment is configured such that the setting value from the external setter 3 can be individually set in consideration of easy fine adjustment or the like after the various setting values are set by using the conversion table.

As is obvious from the above description, in the present preferred embodiment, the appropriate detection sensitivity can be instantly set only by inputting the distance value between the sensor heads into the external setter 3. The phototransmitting intensity, the photoreceiving signal amplification ratio and the photoreceiving judgment threshold are prescribed as the unique values previously determined according to the distance value, thereby avoiding setting any excessive phototransmission, any excessive amplification, any too small photoreceiving judgment threshold or the like. Thus, it is possible to contribute to the prevention of any mutual interference with another optoelectronic sensor.

In the optical multi-axis optoelectronic sensor used as a light curtain or an area sensor, the appropriate detection sensitivity can be set according to the distance between the sensor heads, thereby preventing any mutual interference with another sensor.

What is claimed is:

1. An optical multi-axis optoelectronic sensor, in which a phototransmitting sensor head having a plurality of phototransmitters arranged thereon and a photoreceiving sensor head having a plurality of photoreceivers arranged thereon are disposed opposite to each other, the optical multi-axis optoelectronic sensor comprising:
   first device for inputting distance data equivalent to a distance between the sensor heads;
   second device for determining detection sensitivity based on the distance data input by the first device, wherein the second device determines the detection sensitivity in reference to a conversion means storing therein the distance data and the detection sensitivity which previously corresponded to each other; and
   third device for setting the detection sensitivity determined by the second device.

2. An optical multi-axis optoelectronic sensor according to claim 1, wherein the second device determines the detection sensitivity by specifying any one or more of phototransmitting intensity, a photoreceiving signal amplification ratio and a photoreceiving judgment threshold based on the distance data input by the first device.

3. An optical multi-axis optoelectronic sensor according to claim 1, wherein the first device is implemented by an external setter which is connected to a communication cable for connecting the phototransmitting sensor head and the photoreceiving sensor head to each other.

4. An optical multi-axis optoelectronic sensor according to claim 1, wherein the detection sensitivity is at least one of the phototransmitting intensity of the phototransmitting sensor head, the photoreceiving signal amplification ratio of the photoreceiving sensor head or the photoreceiving judgment threshold of the photoreceiving sensor head.

5. An optical multi-axis optoelectronic sensor, in which a phototransmitting sensor head having a plurality of phototransmitters arranged thereon and a photoreceiving sensor head having a plurality of photoreceivers arranged thereon are disposed opposite to each other, the optical multi-axis optoelectronic sensor comprising:
   first device for inputting distance data equivalent to a distance between the sensor heads;
   second device for determining detection sensitivity based on the distance data input by the first device; and
   third device for setting the detection sensitivity determined by the second device, wherein the distance data and a phototransmitting intensity correspond to each other in the conversion table in such a manner that the phototransmitting intensity becomes higher as the distance between the sensor heads is greater while the phototransmitting intensity becomes lower as the distance between the sensor heads is smaller.

6. An optical multi-axis optoelectronic sensor, in which a phototransmitting sensor head having a plurality of phototransmitters arranged thereon and a photoreceiving sensor head having a plurality of photoreceivers arranged thereon are disposed opposite to each other, the optical multi-axis optoelectronic sensor comprising:
   first device for inputting distance data equivalent to a distance between the sensor heads;
   second device for determining detection sensitivity based on the distance data input by the first device; and
   third device for setting the detection sensitivity determined by the second device, wherein the second device is designed to determine a phototransmitting intensity, a photoreceiving signal amplification ratio and a photoreceiving judgment threshold such that a photoreceiving signal level after amplification obtained when each of the pairs of phototransmitters and photoreceivers is disposed opposite to each other coaxially on an optical axis at the distance between the sensor heads equivalent to the distance data input by the first device becomes a predetermined magnification which is equal to or greater than the photoreceiving judgment threshold and three times or less the photoreceiving judgment threshold.

7. An optical multi-axis optoelectronic sensor, in which a phototransmitting sensor head having a plurality of phototransmitters arranged thereon and a photoreceiving sensor head having a plurality of photoreceivers arranged thereon are disposed opposite to each other, the optical multi-axis optoelectronic sensor comprising:
   first device for inputting distance data equivalent to a distance between the sensor heads;
   second device for determining detection sensitivity based on the distance data input by the first device; and
   third device for setting the detection sensitivity determined by the second device, wherein a conversion table storing therein the distance data and the detection sensitivity which previously corresponded to each other is stored in a predetermined memory in the external setter, and thus, the detection sensitivity is determined in reference to the conversion table.

8. An optical multi-axis optoelectronic sensor according to claim 7, wherein the phototransmitting sensor head includes phototransmitting intensity setting device for adjusting the phototransmitting intensity from the phototransmitter, and further, the photoreceiving sensor head includes photoreceiving signal amplification ratio setting device for adjusting the photoreceiving signal amplification ratio from the photoreceiver and photoreceiving judgment threshold setting device for adjusting the photoreceiving judgment threshold, each of the sensor heads setting the phototransmitting intensity, the photoreceiving signal amplification ratio and the photoreceiving judgment threshold in response to a signal from the external setter via the communication cable.

9. An optical multi-axis optoelectronic sensor comprising:
a phototransmitting sensor head having a plurality of phototransmitters and device for adjusting phototransmitting intensity from the phototransmitter;
a photoreceiving sensor head having a plurality of photoreceivers, photoreceiving signal amplification ratio adjusting device and photoreceiving judgment threshold adjusting device;
a communication cable for connecting the phototransmitting sensor head and the photoreceiving sensor head to each other; and
an external setter having device connected to the communication cable, for inputting distance data equivalent to a distance between the sensor heads, and a conversion table storing therein phototransmitting intensity, a photoreceiving signal amplification ratio and a photoreceiving judgment threshold corresponding to the distance data;
the phototransmitting intensity, the photoreceiving signal amplification ratio and the photoreceiving judgment threshold determined by collating the distance data input via the external setter with the conversion table being set as adjustment values in each of the sensor heads.

* * * * *